United States Patent Office 2,892,352
Patented June 30, 1959

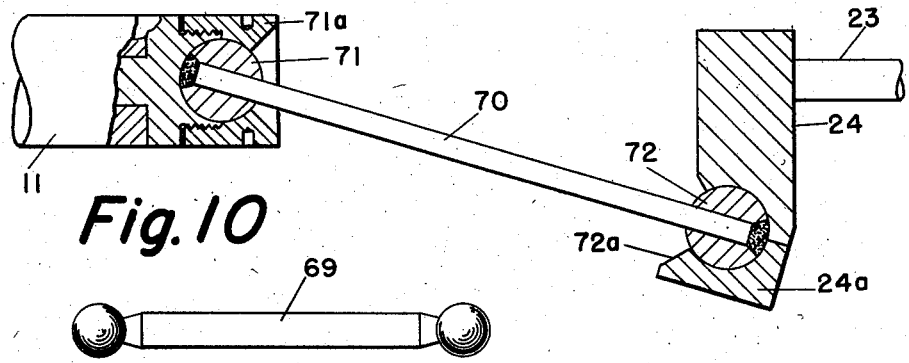
Fig.10
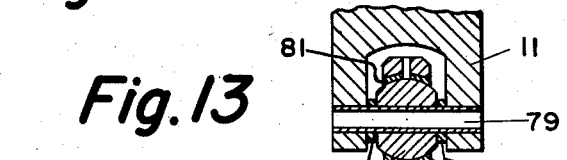
Fig.11
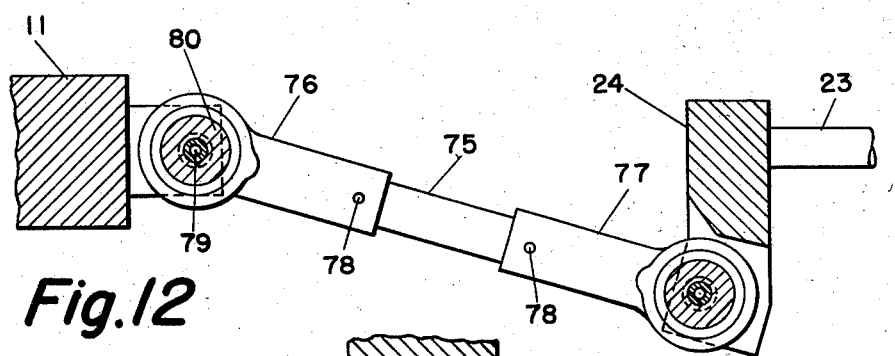
Fig.12
Fig.13
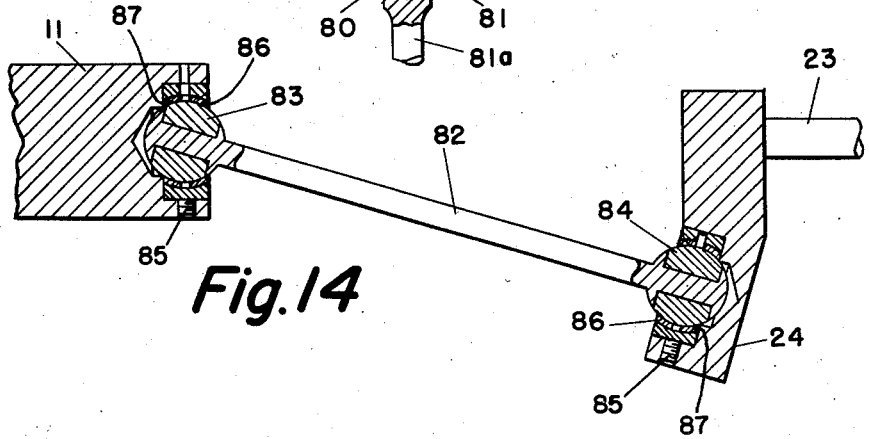
Fig.14

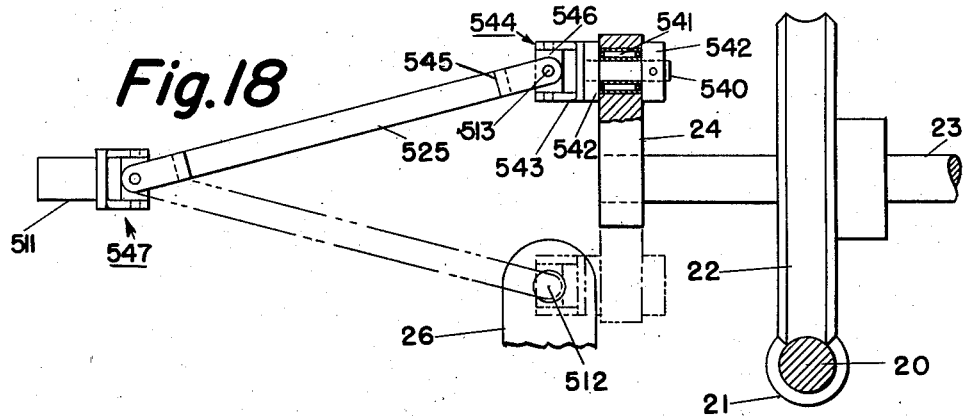
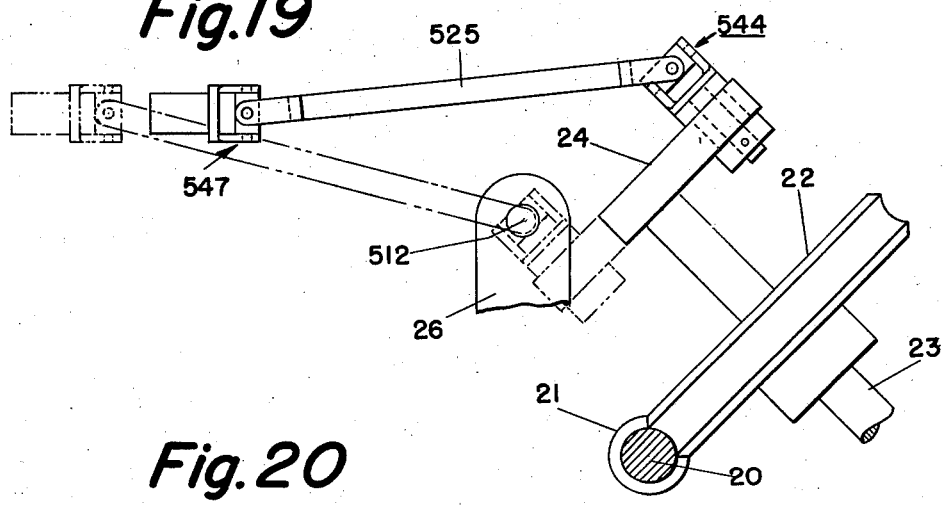
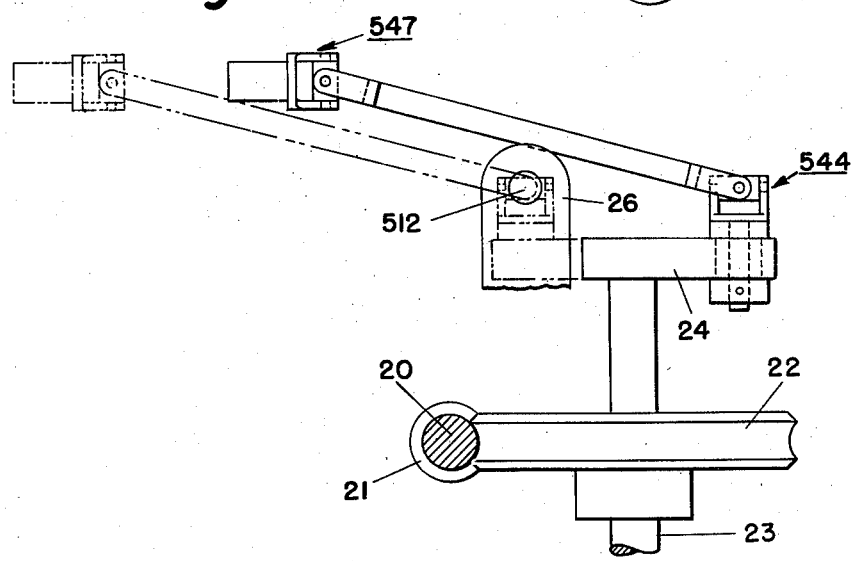

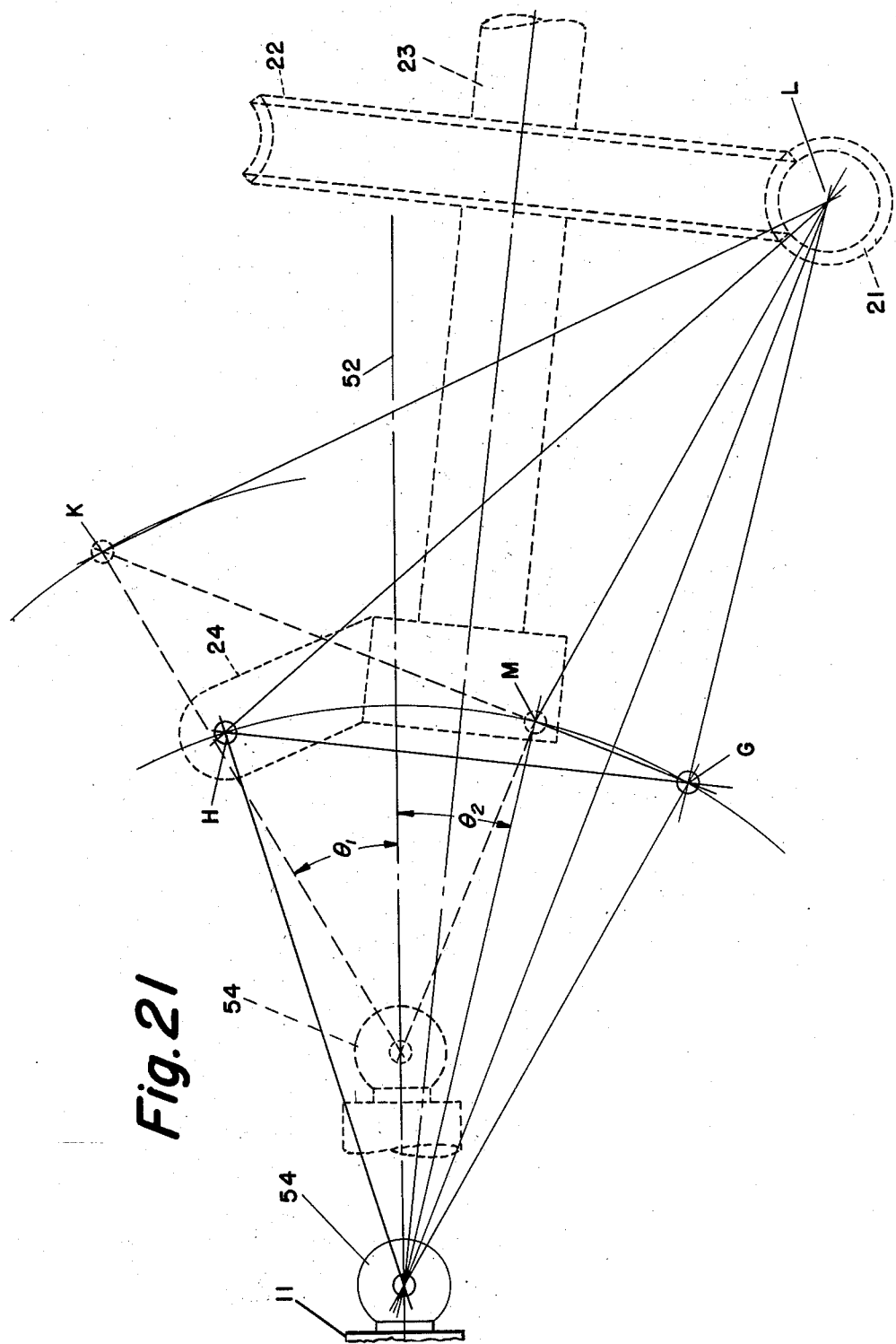

2,892,352

VARIABLE STROKE MECHANISMS

Royal Bartlett Saalfrank, Gulfport, Fla., assignor to Milton Roy Company, Philadelphia, Pa., a corporation of Pennsylvania Application September 12, 1955, Serial No. 533,616

25 Claims. (Cl. 74—44)

This invention relates to variable stroke mechanisms of the type particularly useful in the operation of pumps of the controlled volume type and has for an object the provision of a mechanism which is rugged and reliable, and yet is simple in concept and of low manufacturing cost.

In my Patent No. 2,640,425 there is described a stroke adjusting device by which there is achieved a linear relationship between the amount of adjustment of the driving mechanism and the resultant change in stroke, together with provisions for maintaining the forward end of the stroke at substantially the same point for all stroke lengths. While the mechanism described in my aforesaid patent has been satisfactory and particularly well adapted to controlled volume pumps of large capacity and high discharge pressures, it is an object of my present invention to provide a mechanism of much simpler design and one which retains not only the features and advantages of the mechanism as set forth in my said patent, but also provides a basic design which is highly flexible and well adapted to controlled volume pumps of any desired size and of any selected discharge pressure.

It is a further object of the invention to provide a variable stroke driving mechanism including a crank whose axis of rotation may be tilted to change the length of the stroke.

It is a further object of the invention to provide a pivotal axis so located that upon changing the inclination of the axis of rotation of the crank, the stroke will be varied from zero stroke to full stroke from substantially the same forward position.

It is a further object of the invention to provide a gear reduction which itself forms a component part of the mechanism for adjusting the stroke of the pump.

It is a further object of the invention to provide a variable stroke-adjusting mechanism in which the motor shaft carries a driving gear, and a driven gear meshing therewith is supported by a pivotally mounted frame which forms an integral part of the stroke-adjusting mechanism.

In carrying out the present invention in one form thereof, there is provided a driving connection, such as a link, connected at one end to a crosshead or other member to be reciprocated and at the opposite end to a crank having an axis of rotation extending in the same general direction as the path of movement of the crosshead. The crank is supported on a pivotally mounted sub-frame adjustable to change the inclination of the axis of rotation of the crank. Accordingly, the locus of the crank path can be varied from one in which it is contained in a plane normal to a line extending from the axis of rotation of the crank to the point of connection of the link with the crosshead in its forward position to selected angular positions in which the crank path is contained in a plane disposed at an angle to the path of movement of the crosshead.

The sub-frame is preferably pivoted for rotation about the axis of a drive shaft carrying a driving gear which meshes with a driven gear secured to the crank shaft. In this manner, the driven gear having its plane of rotation at right angles to that of the driving gear can be bodily rotated about the axis of the driving gear for changing the inclination of the crank shaft. Thus, a gear reduction for a driving motor is embodied in and forms a component part of the stroke-adjusting mechanism and eliminates the need of a separate gear reduction generally required for variable stroke pumps.

By substitution of different worm and wheel gear sets of complementary diameters, with varying numbers of gear teeth and worm threads, the effective gear ratio may be varied as desired.

In preferred forms of the invention, the axis of rotation of the driving element may be so located that the forward position of the crosshead remains constant; or for all practical purposes substantially constant, thus providing for variation of stroke by changing the rearward position of the crosshead without change in the forward position thereof.

Controlled volume pumps constructed in accordance with the present invention have a plurality of desirable features. They can be made totally enclosed and dust-sealed. They operate in an oil bath and they may be ganged in horizontal or vertical array with internal reduction gears built into each of them. They have a minimum of parts readily fabricated with minimum machining and in many instances suitable for use by precision casting methods without further machining. The controlled volume pumps are easily serviceable in the field with non-friction bearings and they are readily adjustable during operation either manually or under the control of measuring instruments. The adjusting mechanism is stationary though the pump be operating at any selected stroke. The variation in stroke is linear relative to the movement of the stroke-adjusting mechanism. The low pressure angles are favorable to pumps operating at high and low pressures and long strokes.

For further objects and advantages of the invention and for a more detailed understanding of the flexibility which may be achieved by utilizing the present invention in designing variable stroke mechanisms and controlled volume pumps for widely different purposes, reference is to be had to the following description taken in conjunction with the accompanying drawings, in which:

Figs. 10, 11, 12 and 14 illustrate some modifications of the driving connection between the member to be reciprocated and the crank;

Fig. 13 is a sectional view of an end bearing of Fig. 12;

Figs. 18–20 illustrate a further modification of the invention with the parts in positions for differing lengths of stroke; and Fig. 21 diagramatically illustrates a further modification and one in which the drive shaft is not in alignment with the path of movement of the crosshead.

Figure 1:
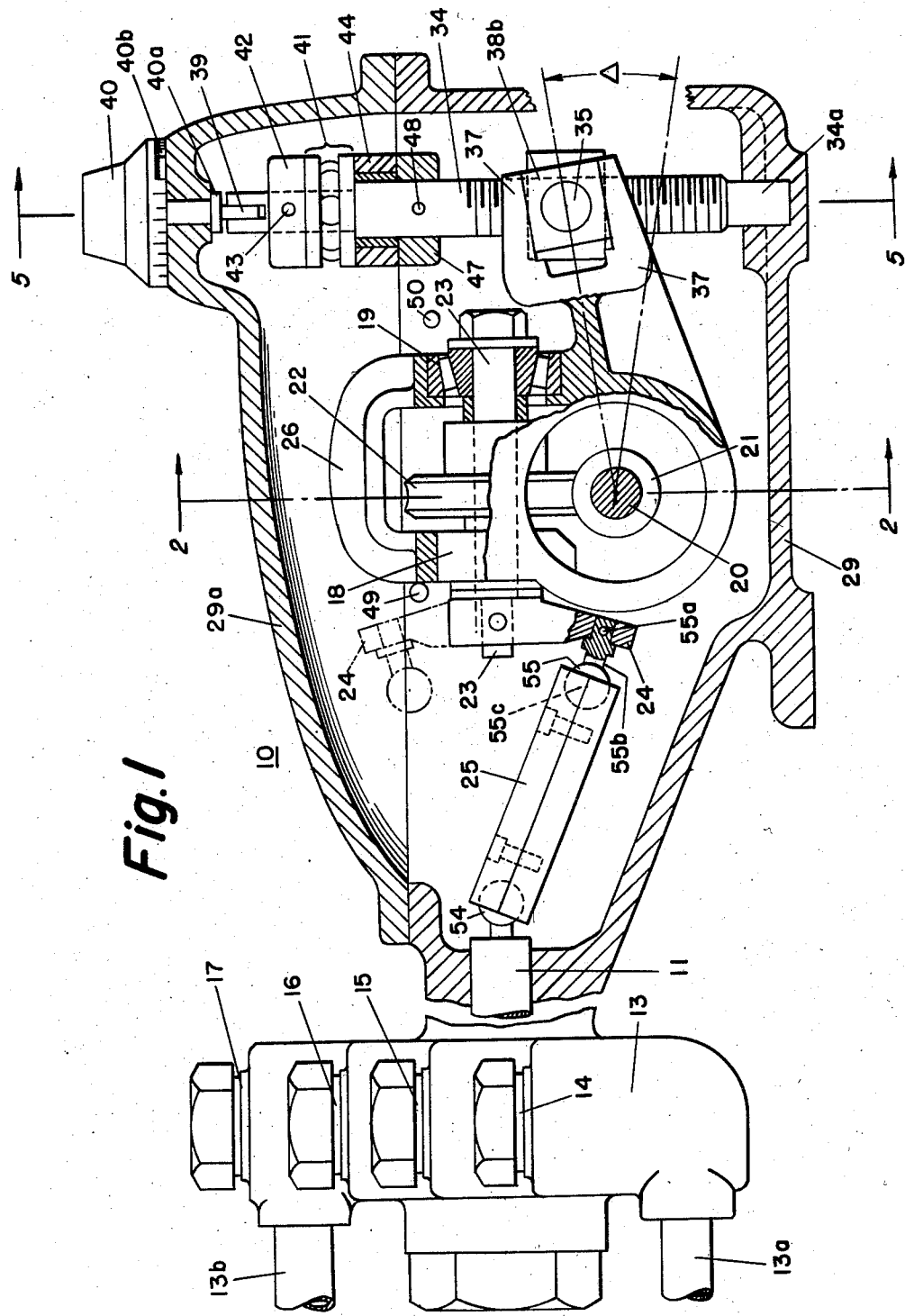
Fig. 1 is a sectional elevation of a controlled volume pump embodying the invention.

Referring now to Fig. 1 the invention in one form has been shown as embodied in a stroke-adjustment mechanism 10 for controlling the length of stroke of a crosshead 11 which drives, or itself forms, the plunger reciprocable within a displacement chamber located internally of a pump-body and valve assembly 13, preferably of the type shown in my copending application, Serial No. 471,623, filed November 29, 1954, entitled "Pump With Sealing Arrangement." It is to be understood, however, that the displaceemnt chamber may be provided in a separate structure or it may include, as shown in U.S. Patent No. 2,263,429 to Sheen, an arrangement in which it is an integral part of an assembly which carries two ball valves on the inlet side and two ball valves on the outlet side of the displacement chamber. In Fig. 1, the pump body and valve assembly 13 has an inlet connection 13a, an outlet connection 13b, two inlet valves 14 and 15, and two outlet valves 16 and 17.

With the parts in the positions shown in Fig. 1, it will be observed that upon rotation of a drive shaft 20, a driving gear 21 secured to the shaft 20 rotates a driven gear 22 secured to the driven shaft 23. The shaft 23 has secured to one end thereof a driving element or crank 24. Extending between the end of the crank 24 and the crosshead 11 is a connecting link or rod 25. The axis of the shaft 23 in the position illustrated is coaxial with the path of movement of the crosshead 11. Accordingly, the locus or trace of the path of rotation of the end of the crank 24, particularly its center of connection 55c with an end of link 25, lies in a plane normal to the axis of the crosshead 11. Accordingly, no longitudinal movement of link 25 occurs, and the crosshead 11 and the associated plunger remain at standstill during rotation of the crank 24 throughout movement from its full-line position to its broken-line position. This is the condition of zero stroke.

Figure 2:
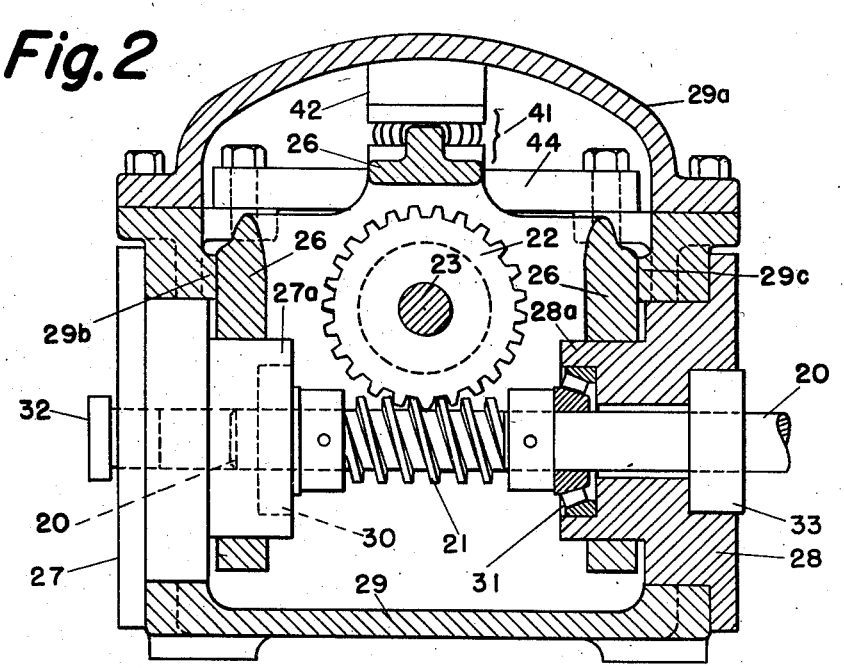
Fig. 2 is a sectional elevation taken on the line 2—2 of Fig. 1.
Figure 6:
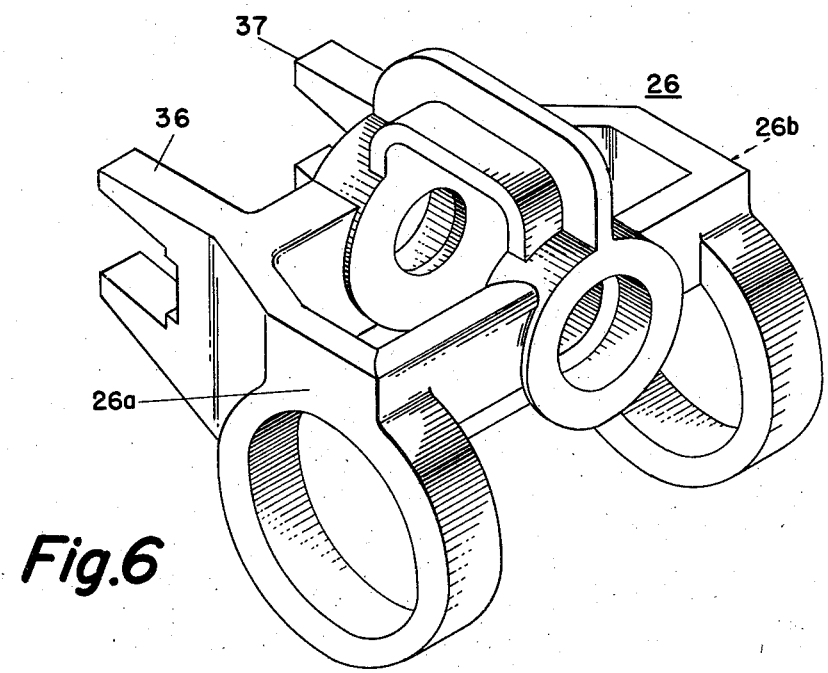
Fig. 6 is a perspective view of the sub-frame of the modification of Figs. 1, 2 and 5.

It is to be observed that the shaft 23 is journaled, as by roller bearing assemblies 18 and 19, in a sub-frame or casting 26, Fig. 6, which is itself rotatably mounted, Fig. 2, on the cylindrical ends 27a and 28a of end caps 27 and 28 extending into and tightly fitting the openings in the stationary frame 29. It will be observed that the drive shaft 20 is journaled as by roller bearing assemblies 30 and 31, carried by the end caps 27 and 28. A plug 32 and an oil-seal 33 are provided so that all of the moving parts may operate in a bath of lubricating oil contained within the closed frame 29.

The sub-frame or casting 26, shown in perspective in Fig. 6, is rotatable about the axis of drive shaft 20. It is shown in Fig. 1, restrained in a fixed position by an adjusting means illustrated in the form of a threaded member or screw 34 threadedly extending through a cross member 35 (see also Fig. 5), having bearing blocks 38a and 38b rotatably carried on the cylindrical ends thereof. Arms having forked ends 36 and 37 extend from the sub-frame 26 radially of the axis of drive shaft 20. The bearing blocks 38a and 38b nest within the forked ends 36 and 37 are conveniently held on cross member 35 by pins. The screw 34 has a reduced end 34a which is guided for rotation in a counterbored opening of the stationary frame 29. The upper end of the threaded member 34 is slotted to receive a flat-sided bladed driving projection 39 of a calibrated adjusting knob 40 having a collar 40a secured to the knob shaft. There is associated with the adjusting means 34 a thrust bearing assembly 41 having an element 42 secured to the adjusting means or member 34 by a pin 43. It also has associated with it a stationary member 44 secured at one or both of its ends to the lower portion of the stationary frame 29 as by cap screws 45 and 46. While a collar 47 is shown secured as by a pin 48 to the adjusting member 34, it is to be understood the collar 47 can in many cases be replaced by a thrust bearing assembly like the assembly 41.

With the parts in position for zero stroke of crosshead 11, a stop 49 is engaged by the sub-frame 26 to prevent counterclockwise rotation of the sub-frame 26 beyond the position shown in Fig. 1. A stop 50 is engaged by sub-frame 26 when rotated in a clockwise direction to a position for maximum stroke of the crosshead 11.

To increase the stroke of the crosshead 11 from zero to any selected length, the knob 40 is rotated (Fig. 1) in a direction to rotate the sub-assembly carried by subframe 26 in a clockwise direction. The rotation is about the axis of the drive shaft 20. Accordingly, the axis of the driven shaft 23 will be tilted in a clockwise direction. The effect of such tilting action, i.e., of driven shaft 23, is to tilt the plane which contains the locus of movement of the crank so that it is inclined relative to the path of movement of the plunger 11. Accordingly, as the crank 24 rotates about the inclined axis of shaft 23, it moves the link or rod 25 from its lowermost position illustrated in Fig. 1 toward an upper position displaced to the right of its illustrated broken-line position. Rotation of the crank from its uppermost position returns it to a position where the crosshead 11 is returned, to a close approximation, to the position shown in Fig. 1. As will later be more fully explained, the forward position of the crosshead 11, over a selected range of adjustment, is but little affected by increasing the stroke of the pump, and from the standpoint of achievement of a constant forward position of the plunger within the displacement chamber, the variations which occur are so small they may be neglected.

While for some applications, and in accordance with a modification (Figs. 18–20) later to be described, the crank 24 and shaft 23 can be rotated in a clockwise direction by as much as 90° for maximum change in the stroke of the crosshead 11, in the modification of Figs. 1–6, the stop 50 is provided to limit the stroke adjustment to materially less than ninety degrees and for the reasons which will now be set forth.

Figure 3:
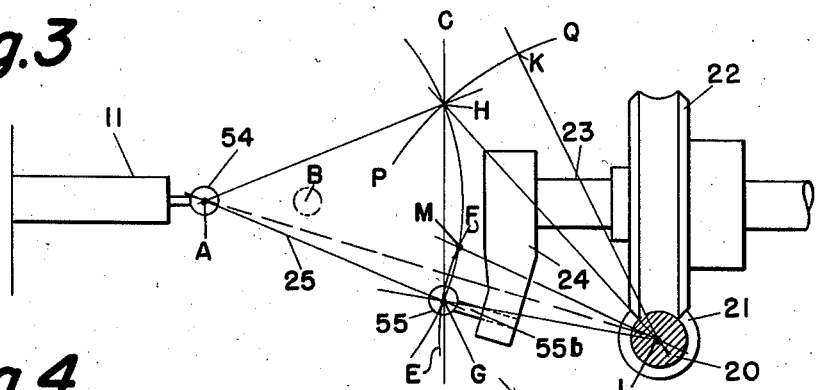
Figs. 3 and 4 are schematic diagrams explanatory of the operation of the variable stroke mechanism embodied in the pump of Figs. 1 and 2.
Figure 4:
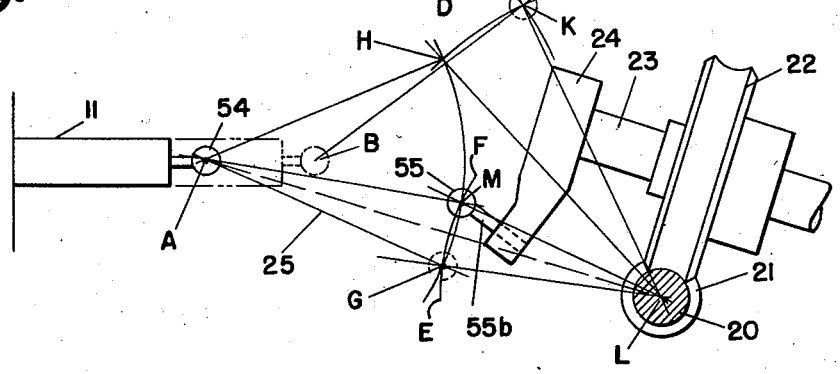

Referring to Figs. 3 and 4, the diagrams are for the mechanism of Figs. 1, 2, 5 and 6 though on a reduced scale. Ballheads 54 and 55 are interconnected by the link 25. In Fig. 3, corresponding with Fig. 1, the trace CD of the plane containing the locus of the path of movement of the center of the ballhead 55 is normal to the axis of the path of travel of the plunger and crosshead 11. The link 25 when rotated by a crank 24 describes a right cone whose apex is the center of ballhead 54.

As the shaft 23 is tilted in a clockwise direction about the axis of the drive shaft 20, the ballhead 55 in its lowest position moves along the arc EF from the initial nostroke position G to a limit-position M selected for full stroke. The latter position M is one in which the crosshead 11 is in exactly the same forward position for full stroke as for zero stroke. This condition is fulfilled as shown in Fig. 4 since a straight line between the center of the ballhead 54 and the axis of shaft 20 is the perpendicular bisector of the chord of the arc GM.

As the shaft 23 is tilted about the axis of shaft 20, the ballhead 55 moves along arc EF (Fig. 3) and from the geometry involved it will be seen that a slight displacement of the crosshead 11 in a forward direction occurs. The crosshead moves less than the distance between the mid-points of the arcs intersecting at G and M. One arc is described with the radius of link 25 and the other with a radius GL which is the same as ML. The movement of crosshead 11 is slightly less by reason of the angular relation of link 25 to the path of movement of the crosshead.

The full stroke of the controlled volume pump is limited to less than the maximum obtainable stroke to provide compactness of design and to assure, within the compact design that at the end of each stroke regardless of length, the plunger will return to the same forward position within acceptable limits.

The mechanism of Figs. 1–4 has a number of additional desirable features. The angle HLK, Figs. 3 and 4, through which the ball 55 moves in its upper or rearward position from zero stroke to full stroke is equal to the angle GLM through which the ball 55 moves in its lower or forward position from zero stroke to full stroke. The line between A and L is the perpendicular bisector of the chord GM. The point L also lies on the perpendicular bisector of the chord between HK. There is a substantially linear relationship between the change in stroke of crosshead 11 and the movement of the ballhead 55 in its upper position along the arc PQ from zero stroke position at H to full stroke at K. Accordingly, the scale on knob 40, Fig. 1, is linear. The linear relationship is advantageous when a motor or other mechanism is used for automatically turning the member 34 to change the inclination of shaft 23. Thus, the change in stroke resulting from adjustments of sub-frame 26 through the angle A, Fig. 1, will be linearly proportional to change of position. The scale on knob 40 or a revolution counter driven by member 34 will provide indications of the length of stroke or quantity per stroke of liquid in metered flow passing through outlet 13b.

The adjusting screw 34 is to some degree self-locking by reason of its threaded engagement with cross member 35. To prevent any rotation of member 34 by reason of any thrust thereon from the forked ends 36 and 37, clamping means are provided. For example, a brake or clamping lever 40b, Fig. 1, actuates a friction surface against the frame to prevent rotation of member 34. The member 34 holds the sub-frame 26 in a selected position and neither the sub-frame nor the member 34 partakes of a reciprocatory movement during reciprocation of crosshead 11.

Figure 5:
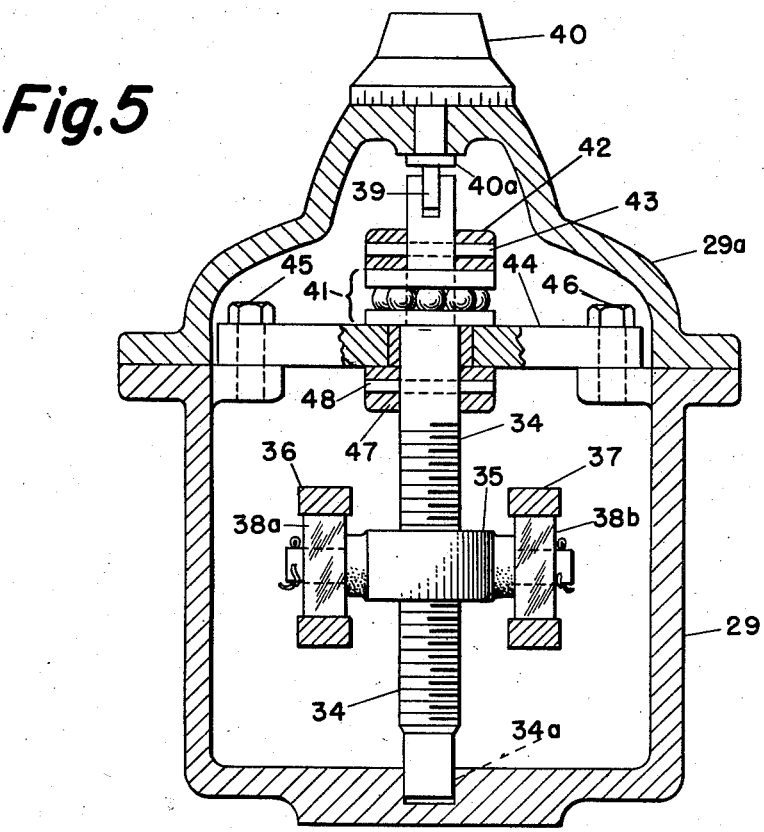
Fig. 5 is a sectional elevation taken on the line 5—5 of Fig. 1.

By providing the inturned lugs, Fig. 5, cast integral with the frame 29, all machined surfaces are associated with the main frame 29, and there is thus eliminated the problem of machining parallel surfaces from the cover 29a to meet with corresponding surfaces within the housing or frame 29. The cross member 44, though it may be cast integral with frame 29, is secured to the machined surfaces of the lugs as by cap screws 45, 46, and the two components of the thrust bearing 41, Figs. 1 and 5, are in cooperative relation with member 44.

To provide additional guiding surfaces for the sub-frame 26, the main frame 29 has inturned bosses 29b and 29c, Fig. 2, the flat faces thereof providing bearing surfaces for corresponding flat faces 26a and 26b provided on the upper portions of the sub-frame 26. These surfaces take any sideward thrust developed by the sub-frame 26.

To change the gear ratio, a worm and a worm wheel of differing diameters may replace those illustrated in Figs. 1 and 2, the several sets of gears having complementary diameters to conform to the spacing between the drive shaft 20 and the crank shaft 23. The gear ratio can also be varied by changing the thread lead of the teeth on gears of the same size. By utilizing combinations of the foregoing alternatives, the speed reduction which forms a part of the adjusting mechanism will provide the needed speed selections for nearly all applications. Where a plurality of controlled volume pumps are to be operated at different speeds from the same drive shaft, different gear ratios will be utilized for them.

As will later be explained, the link 25 may take various forms. In Fig. 1 it comprises two members suitably secured together to form spherical cavities in the ends to receive the balls 54 and 55. To provide clearance between the end of the link 25 and the crank 24, the ball 55 is mounted on a pin 55b extending into the crank arm and having a shoulder which bears against the crank. A locking pin 55a extends through to the crank 24 and through the member carrying the ball 55.

It will be observed, Figs. 3 and 4, that the axis of the pin 55b is inclined relative to the plane, whose trace is CD, Fig. 3, in which the center of ball 55 rotates. In this connection, it is to be observed that the plane CD in Fig. 3 is normal to the axis of shaft 23. The plane in which the center of the ball 55 rotates is always normal to the axis of shaft 23. For this reason the inclination of pin 55b has been referred to the plane CD instead of to the crank 24. The crank 24, regardless of shape, will always produce the aforesaid rotation of ball 55.

With the foregoing in mind, it is to be observed that for the condition of zero stroke, Fig. 3, the link 25 extends from ballhead 54 to ballhead 55 at an angle which remains constant throughout the rotation of crank 24. However, as the axis of shaft 23 is bodily inclined or rotated about the transverse axis of shaft 20, a change occurs in the angles that the link 25 makes with respect to the plane in which the center of ball 55 rotates. The angle gradually changes as the ball 55 is rotated along the inclined plane established by the inclination of shaft 23. Accordingly, as shown, Figs. 10 and 14, and particularly in Figs. 3 and 4, the effective axis of the pin 55b is inclined relative to the plane in which the center of ball 55 rotates so that at about the midstroke position the axis of pin 55b extends approximately in the direction of the bisector of the angle GAM. For most cases, the pin 55b may be in alignment with the bisector of the aforesaid angle, this being the angle between the link 25 for zero stroke in the forward position and the position of the link 25 for maximum stroke in the forward position.

Inasmuch as the angle between the link in its AH position and the position of the link in its BK position (corresponding respectively to the position of the ballhead 54 for zero stroke and for full stroke in the rearward position) is not the same as the aforesaid angle GAM, compensation may be made in the position of the axis of pin 55b for inclination thereof at an angle which best divides the movement of link 25 relative to ballhead 55 by approximately equal amounts as the stroke is changed in one direction or the other from the midstroke position. Accordingly, in all modifications of the invention, particularly those utilizing ball-socket joints, the inclination of pin 55b may be selected to correspond with the bisector of the maximum angle the link makes with respect to its plane of rotation at zero stroke and at full stroke.

While in the foregoing description reference has been made throughout to the axis of pin 55b, for clarity of description, it will be observed that in Figs. 10, 12 and 14 the universal joint connection between each link 70, 75 and 82 corresponding with link 25 of Figs. 1–6 has the spherical ball or bearing surface formed as an integral part of the link. Nevertheless, the end of the crank 24 is inclined to meet the aforesaid requirements of the axis of pin 55b. Thus, in Fig. 10 the effective axis of pin 55b determines the position of link 70 for the midstroke position, and as illustrated the inclination of the end of the crank 24 is such that the link 70 at the midstroke position is midway of the surface 72a which is a frustrum of a cone. While such surface 72a need not be conical, it does provide clearance for movement of the link 70 and assures the necessary clearance as the crank 24 is rotated with the stroke set at any selected value from zero to maximum. The opposite end of link 70 terminates in ball 71 held in a spherical bearing member 71a having a conical opening for clearance purposes.

With the above understanding of the principles underlying the invention, it will be understood that many variations are possible within the spirit and scope of the appended claims.

Figure 7:
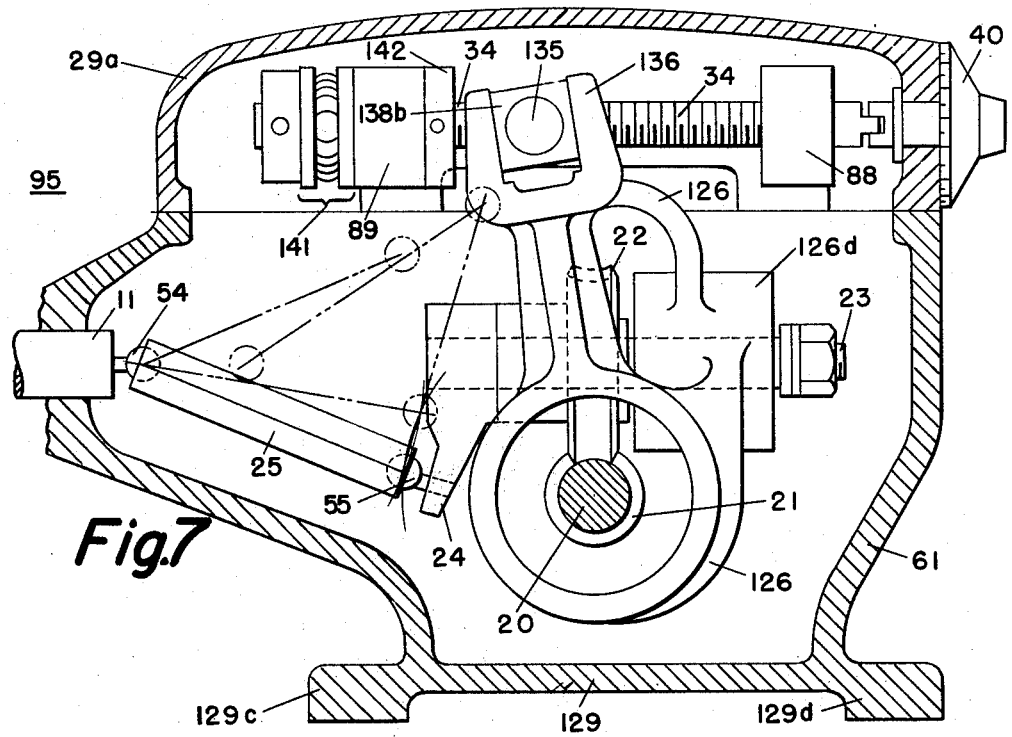
Fig. 7 is a sectional elevation of a modified form of the invention.
Figure 8:
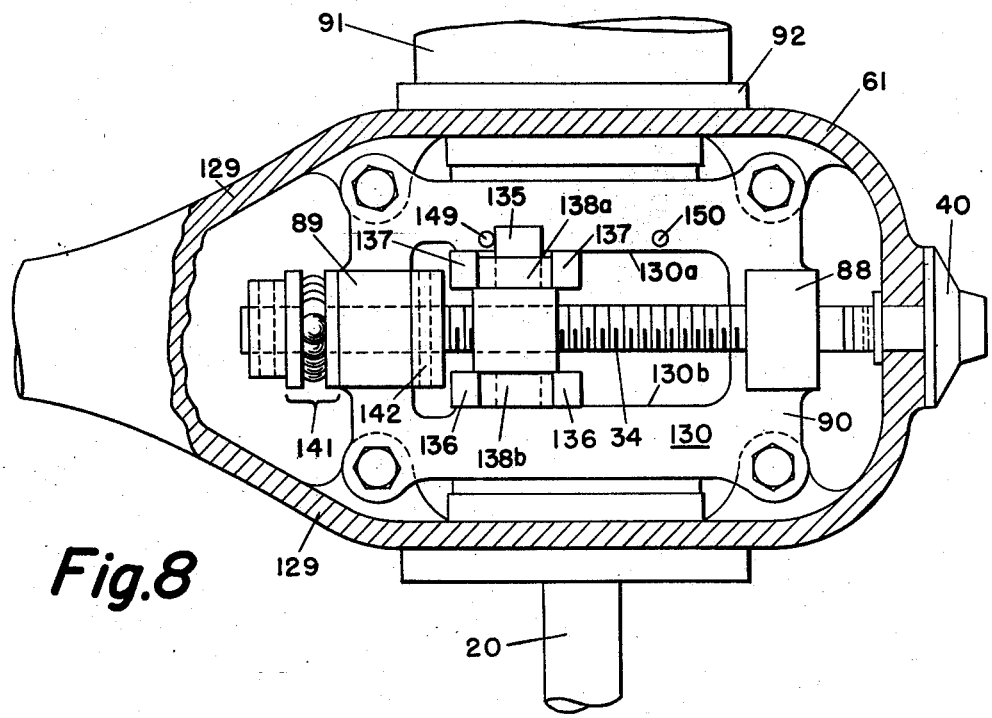
Fig. 8 is a plan view of the mechanism of Fig. 7 with the cover removed.

For example, referring to Figs. 7 and 8, the overall length of the adjusting mechanism has been considerably reduced by locating the adjusting screw 34 above the sub-frame 126. While the double-bearing assembly of the modification of Figs. 1–6 may be utilized, in Fig. 7 the crank shaft 23 is supported by a bearing assembly included in the cylindrical portion 126d of the frame 126. The stationary frame 129 has four inturned projections which support a generally rectangular frame 130, cap screws extending therethrough and into threaded engagement with each of the inturned portions of the frame. The rectangular frame 130 has finished surfaces 130a and 130b against which bear finished surfaces on the forked ends 136 and 137 of the arms extending from the frame 126. Stops 149 and 150 extend upwardly from the frame 130 in position to limit the extent of adjustment of the cross member 136 and thus limit the extent of the stroke adjustment of crosshead 11.

The frame 130 includes bearing blocks 88 and 89 for journaling the threaded member 34. A thrust bearing assembly 141 bears against a collar which engages the face of a bearing block 89 to take the thrust from the sub-frame 126. A thrust collar 142 secured to member 34 bears against block 89 to take a low order of thrust in the opposite direction. It is to be understood the knob 40 may be replaced by a wheel of somewhat larger diameter than the knob for ease in making the adjustments, a clamp being associated therewith to lock the threaded member 34 in any selected position. It is likewise to be understood that the member 34 may carry a gear engaged by the driving gear of a motor or other suitable automatic adjusting mechanism for rotating member 34 to change the stroke.

The geometry of the design of Figs. 7 and 8 is quite similar to that of Figs. 1–6. In Fig. 8, it will be observed that a motor 91 has a flange 92 bearing against one side of the main frame 129. Thus, a flanged motor may be directly connected to the frame 129 as by cap screws or other suitable fastening means. The motor shaft itself may carry the worm 20. As shown in Fig. 8, the shaft 20 extends beyond the frame 129 and in position to be attached to or to form a part of a second controlled volume pump. In Fig. 8, oil seals are provided around the shaft 20 as it enters and leaves the bearing supports to maintain oil-tight the main housing or frame 129.

Figure 9:
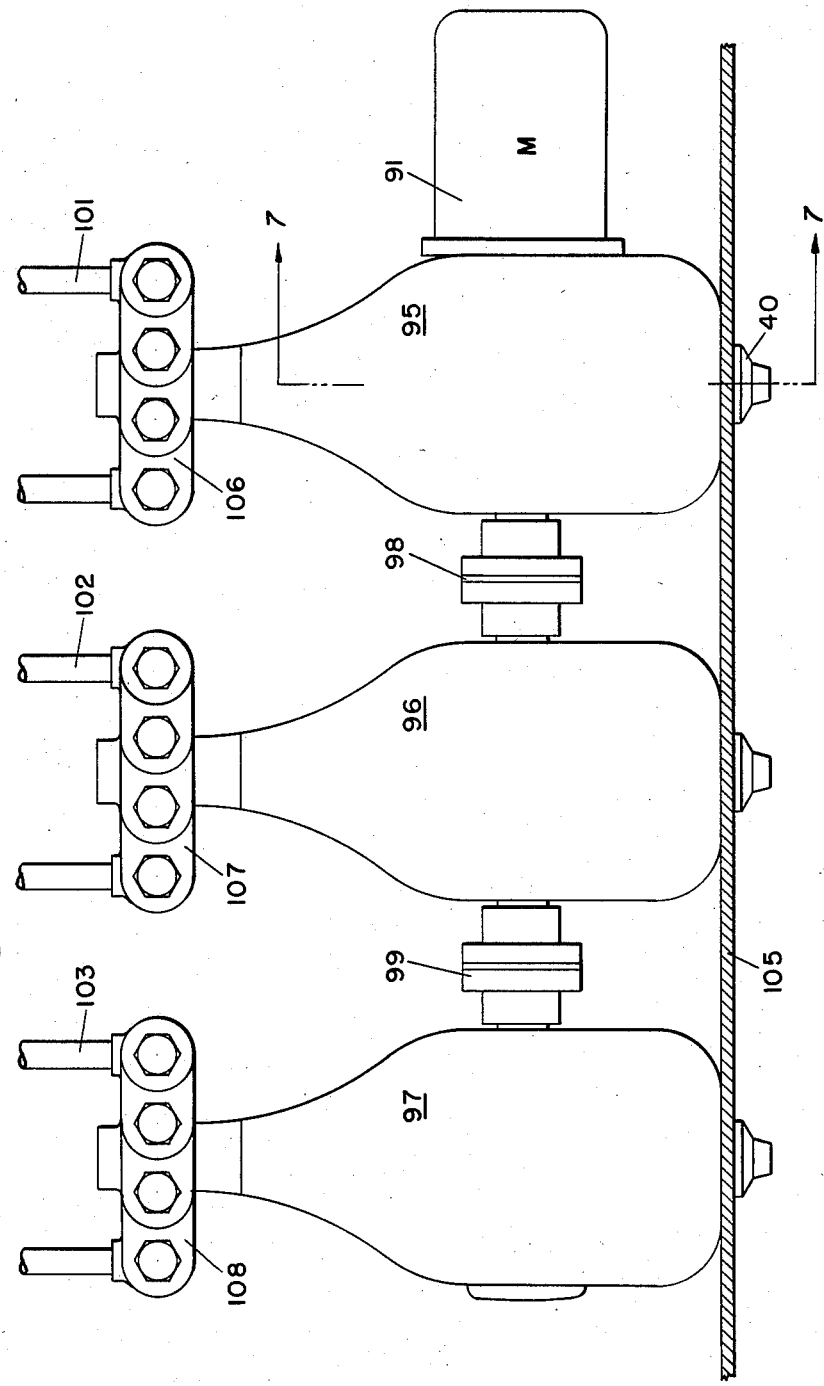
Fig. 9 illustrates the mounting of a plurality of controlled volume pumps on a panel board.

In Fig. 9, the motor 91 is illustrated as driving the pumps 95, 96 and 97, conventional shaft couplers 98 and 99 being interposed intermediate the adjacent pumps. While Fig. 9 has been described as a plan view of the assembly, it may also be taken as a side elevation, the point being that controlled volume pumps embodying the present invention are suitable for mounting on a panel 105 in vertical array or in horizontal array. The mounting in vertical array will, in general, be preferred to conserve floor space, and the panel itself may carry supporting brackets to be engaged by the feet 129c and 129d, Fig. 7, or a separate supporting member may be disposed to the rear of the panel to carry the weight of a plurality of the pumps.

In some instances, it may be desirable to mount the pumps directly on the face of the panel, and this may be done by bolting the feet of each frame directly to the panel with the body portion, the motor 91 and the pump-bodies and valves 106, 107 and 108 in front of the panel. As many controlled volume pumps may be ganged together as may be desired, the only limitation on number being the size of the motor 91 and the permissible torque which may be imposed upon the drive shaft 20. Each pump may operate at a different speed and with a differing stroke, and thus an assembly of them may be controlled at the panel board in association with other instruments to accommodate the requirements of complicated processes. With each pump operating from the common motor 91 at a different speed, it will, of course, be understood each will have a gear ratio differing from the others and each selected for the particular speed at which the individual pump is to be operated. By providing the single drive, the ratio of each stream to the others, i.e., between discharge lines 101—103, will be maintained constant with change in speed of the motor 91. Thus, the system lends itself to simultaneous change in flow of streams while the flow-ratios are kept constant.

In the several modifications thus far described, the link 25 has been illustrated as of sectional form and having spherical bearings at each end which receive the ballheads 54 and 55. The spherical concave bearing surfaces of link 25 are of greater extent than a hemipshere and thus provide a maximum area of bearing surface and overhang for the positive return of the plunger and crosshead 11. Links of different kinds may be utilized in place of the modification of Fig. 1. For example, in Fig. 10 a rod 70 is provided with ballheads 71 and 72 nesting within spherical bearing surfaces respectively provided in crosshead 11 and in crank 24. Both of the spherical cavities are formed in part by removable portions as at 24a and 71a which provide for the assembly of the link or rod 70 with the crosshead 11 and the crank 24. The cap or portion 71a is screwed on a reduced end of a removable insert in the crosshead 11, while the cap or portion 24a is provided with openings (not shown) for cap screws.

In Fig. 11, the link 69 has spherical ends integral with the body portion. The link including its spherical ends may be machined from suitable bar stock. Removable caps and bronze inserts are provided to complete the assembly, these being similar to the cap 24a of Fig. 10.

In Fig. 12, the connecting link 75 has replaceable end-units 76 and 77. They may be threaded on link 75 and further secured thereto as by pins 78. As illustrated, they are of the type available on the market under the trade designation of "Heim Unibal" spherical rod end bearings. A detail of such a bearing is shown in Fig. 13 in which the crosshead 11 is shown as terminating in a fork through which there extends a hollow pin 79. Between the arms of the fork is the spherical element 80 of the spherical bearing. The mating portion of the bearing includes wear or bearing inserts 81 which may be of bronze. Spacers 79a are provided to keep the element 80 centered in the fork and to provide clearance for angular movement of the link 81a.

A further variation for the link drive is shown in Fig. 14 where the rod 82 carries the spherical elements 83 and 84. These end portions engage mating surfaces provided by wear inserts 86 and 87. The wear inserts are carried by backing members rigidly secured respectively to the crosshead 11 and to crank 24, as by one or more set screws 85 extending into oil grooves of the bearings.

Instead of ball and socket connections, a rigid link including a universal joint may extend between the crank 24 and the crosshead 11. The universal joint will take care of change in angularity. If a ballhead be then included at one end only, the crosshead 11 will not be rotated. In some instances it may be permissible for the crosshead 11 to rotate either with or without rotation of the associated plunger.

Figure 15:
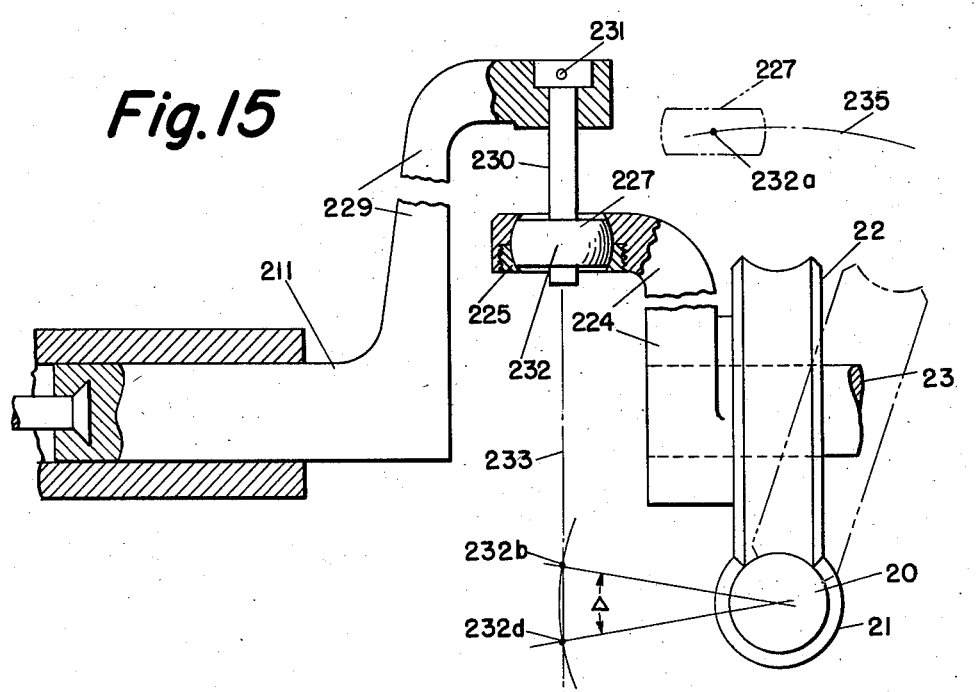
Figs. 15, 16 and 17 illustrate further modifications of the invention.

In the modification of Fig. 15 the built-in gear reduction has been illustrated as including the worm 21 and the worm gear 22. It will be understood that the gear reduction will be supported on a sub-frame 26 in the same manner as in the modification of Figs. 1–6, the sub-frame and the stroke-adjusting mechanism having been omitted from Fig. 15 to simplify the drawing and to make easier to understand.

In Fig. 15 the crank arm 224 is secured to the shaft 23 of gear 22 for rotation therewith. At the upper enlarged end of the crank 224 is disposed a bearing assembly 225 for a bearing member 227 having a spherical outer surface. The driving connection between the crank 224 and the crosshead 211 is formed by a driving arm 229 having a bearing pin 230 rigidly secured to the outer end of the arm 229 as by a pin 231.

In Fig. 15 the parts have been illustrated in position for zero stroke of the crosshead 211. The reference character 232 designates the center of the bearing assembly. When the crank 224 is rotated through 180°, point 232 then lies on the vertical line 233 and at the point indicated by 232d. When the axis of shaft 23 is tilted about the axis of shaft 20 as through the angle Δ, the point 232 is moved along the arc 235 to the point marked 232a. The locus of the path of point 232a, upon rotation of arm 224, is then contained in a plane which is inclined relative to the axis of the crosshead 211 and extends through the point 232b, the location of point 232 for the forward position of the crosshead 211 for maximum stroke. As illustrated, the zero stroke and full stroke positions have been selected to be equal on opposite sides of the perpendicular bisector of the chord extending between the points 232b and 232d. Accordingly, the forward position of the plunger will be the same at zero stroke and at full stroke.

Figure 16:
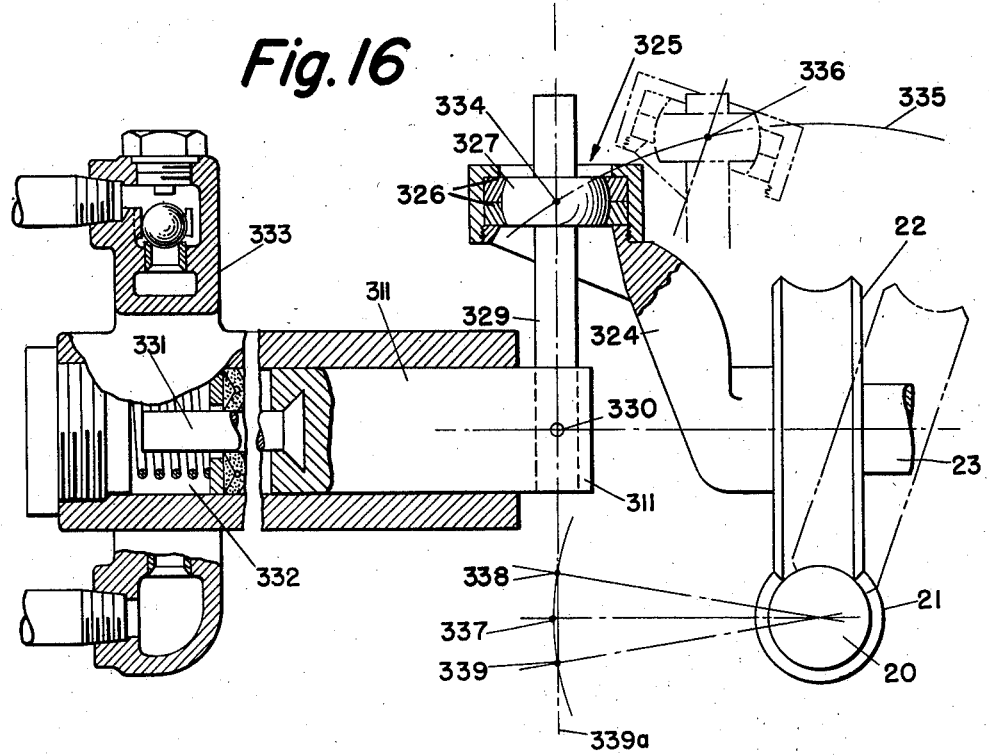

It will be observed that as the stroke is increased, the crank 224 is rotated in a clockwise direction about the axis of shaft 20. As crank 224 moves along the arc 235, the bearing assembly 225 moves in a clockwise direction relative to the bearing element 227. At the position corresponding with zero stroke, the bearing assembly 225 is normal to the driving pin 230. This is the optimum position of the parts to equalize the movement between bearing element 227 and the bearing assembly 225. In the modification of Figs. 15 and 16, in contrast with earlier-described modifications, the bearing assembly, as shown in Fig. 16, will be rotated from the broken-line position, for the full-stroke setting, to a position at the forward position of the crosshead where the bearing assembly has the same degree of angularity as the broken-line position but on the opposite side of the axis of the arm carrying the spherical bearing element shown as 227 in Fig. 15 and as element 327 in Fig. 16. These provisions provide for the maximum change of stroke for a given clearance of the pin 230 with the sides of the bearing assembly 225, Fig. 15. It is to be observed that as the arm 224 is moved from the illustrated position to the full-stroke position, there is translational movement of the bearing element 227 upwardly along pin 230. The cylindrical inner bearing surface of the element 227, slidable on pin 230, may comprise a bronze insert or other wear-resisting material to minimize friction and for greater length of life of the working parts.

The arrangement of the parts in Fig. 15 makes possible a decrease in the length of the mechanism by a substantial amount. This can be readily understood by inspection of Fig. 15 which reveals that the actuating arm 229 does not extend at an angle comparable to the link 25 of Fig. 1, and thus the crosshead and associated plunger and valve assembly can be located nearer to the actuating mechanism including the arm 224 and the associated reduction gear. The decrease in length has been emphasized in the modification of Fig. 16.

In Fig. 16, the arm 324 is driven from the gear 22 in a manner similar to the previously described modifications. The outer end of the arm 324 includes a bearing assembly 325 including a bearing element 327 having a cylindrical inner bearing surface and a spherical outer bearing surface riding in bearing inserts 326. Through the inner bearing element 327 there extends an arm 329 solidly anchored in the crosshead 311 and secured in place as by a pin 330. At the outer end of the crosshead 311 a plunger 331 extends into a displacement chamber 332 located centrally of a pump body and valve assembly 333. The details of the valve assembly are substantially the same as in my above-identified copending application.

In the modification of Fig. 16, the driving center 334 moves along the arc 335 from the illustrated position for zero stroke to the position 336 for full stroke.

In both of the modifications of Figs. 15 and 16, it will be observed that the forward position of the crosshead at zero stroke and full-stroke is the same. In Fig. 16, the forward position of crosshead 311 occurs at the points 338 and 339 on line 339a. The arm 324 carrying the bearing assembly 325 is normal to the axis of pin 329 which in turn is normal to the axis of crosshead 311.

In Figs. 15 and 16, it will be apparent that the length of stroke can be readily increased by merely increasing the radius of the crank arms 224 or 324, i.e., Fig. 16, the distance between its point of connection as at 330 to the point of engagement 334 with the driving arm 329. As the length of the crank 324 and of its point of contact 334 with the arm 329 is moved away from the axis of the crosshead, the radius of adjustment between axis 20 and the point 334 will be increased. If, however, the zero-stroke and the full-stroke positions be selected to be equal on opposite sides of the perpendicular bisector of the chord 339, 338, the forward position of the plunger will be the same in both instances.

It is again emphasized the equalization of the aforesaid angles is not essential to the operation. It is a desirable feature. In the modifications of Figs. 15 and 16 it will be observed that the change in the forward position of the crosshead as the stroke varies from zero to full stroke changes less than in the modification of Fig. 1. In the modifications of Figs. 15 and 16, the deviation in the forward position of the crosshead does not exceed the maximum distance between the chord and the arc between points 232b and 232d, Fig. 15; and 338, 339, Fig. 16. While in Figs. 15 and 16 the crossheads 211 and 311 rotate with the crank arms 224 and 324, the plungers may optionally rotate with the crossheads or be constrained against rotation, a suitable slip connection being provided between each plunger and crosshead. In some instances, the packing itself, as shown in Fig. 16, may be adequate to prevent rotation of the plunger 331, and in some instances it may be desirable to permit a certain amount of rotation of the plunger 331. Mort particularly, the connection may provide for relative rotation. Whether or not such rotation occurs can depend upon the relative frictional forces as between crosshead 311 and plunger 331 and the frictional forces between the plunger 331 and the packing. In Fig. 16, the plunger 331 has been illustrated as of rather small size compared with the plunger chamber 332 to clarify the showing of the spring which holds the packing securely in place and also to emphasize the fact that in the metering device to which the invention has been applied, the flow of liquid depends upon a change in volume within the displacement chamber 332 and not upon any closeness of fit between the plunger and an adjacent cylinder wall.

Figure 17:
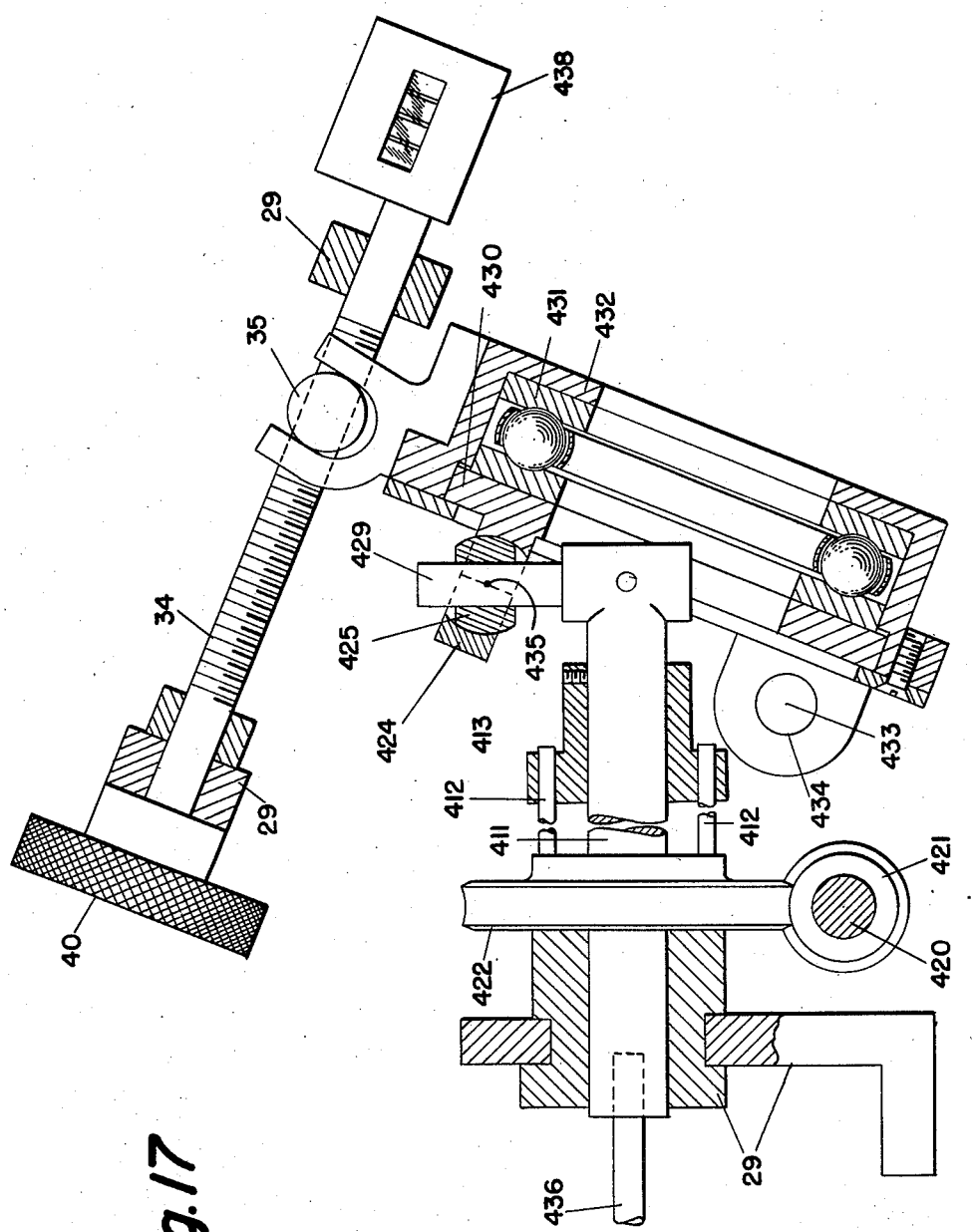

In the modification of Fig. 17, the crosshead 411 is coaxial with a driven worm wheel 422 driven by a worm 421 supported on a drive shaft 420. The worm wheel 422 is journaled in a part of the frame 29, not shown, and has extending from the hub portion at least three drive rods 412, two of them appearing in Fig. 17. These drive rods are rigidly secured in the hub and extend through openings in a collar 413 rigidly secured to the crosshead or reciprocable member 411 as by set screws. The crosshead 411 has extending from it an arm 429 received by a bearing assembly 425, which may be of the same general construction as described in connection with Fig. 16. The bearing assembly 425 is carried by an arm 424 extending from one portion 430 of that bearing assembly, the other portion 431 of which is carried in a pivotal structure 432. The structure 432 is pivoted about the axis 433 of a shaft 434. The shaft 434 is located so that when a line extending from its axis 433 to the point 435 of the driving connection is normal to the axis of the crosshead 411, the crosshead 411 and its associated plunger 436 are in their forward positions. These positions also correspond to the positions of zero stroke. As shown in Fig. 17, the parts are in adjustment for full stroke.

Upon rotation of the worm 421, the worm wheel 422 rotates the elements 412 to drive collar 413 and the crosshead 411. The rotation of the crosshead rotates the arm 429 as well as the part 430 of the bearing assembly. This bearing assembly is constrained for rotation along the inclined plane of structure 432, and thus as the arm 424 is rotated along or in said inclined plane, the crosshead 411 is moved from its illustrated rearmost position to a forward position identical with that for zero stroke. In this manner the forward position of the crosshead remains unchanged with no deviation whatsoever and throughout any range of adjustment of the stroke. The adjusting means is quite similar to that of the modification of Figs. 1–6, and the parts have been given like reference characters. A revolution counter 438, as of the "Veedor Root" type, is actuated by the screw 34 and since the adjustment is linear, the counter 438 will provide readings correlating liquid displacement and stroke adjustment. In the modification of Fig. 17, the plunger 436 has been shown as rotatable with the crosshead 411. It is to be understood that the plunger 436 can be connected to the crosshead 411 by a ball joint or other means to provide for relative rotation between the plunger 436 and the crosshead to the end that the plunger will remain stationary while the crosshead rotates.

In the modification of Fig. 18, there have been combined the desirable features of the modification of Figs. 16 and 17. In Fig. 18, the worm wheel 22 and worm 21 are mounted in a sub-frame of the type disclosed in the modification of Figs. 1–6 and a crank 24 is driven by the shaft 23. Through the crank 24 there extends a driving pin 540 itself journaled in arm 24 as by roller bearings 541, and collars or flanges 542 are provided to prevent end play. One part 543 of a univeral joint 544, of the Hooke type, is secured to the drive pin 540, while a similar part 545 comprises the forked end of the link 525. The parts 543 and 545 are interconnected through axes extending at right angles to each other. In the form illustrated, a center block 546 carries the pivot pins of the universal joint. The link 525 terminates in a forked end of a similar universal joint 547 which serves to connect the link 525 to the crosshead 511.

A part of the sub-frame 26 is shown in Fig. 18. Instead of the sub-frame 26 pivoting about the axis of shaft 20 as in Figs. 1–6, in Fig. 18 the sub-frame 26 including the built-in reduction drive 21, 22 is pivoted about the axis 512. The frame 26, only one part of which appears in Fig. 18, is U-shaped to provide adequate space between two upright projections for rotation of the arm 24 between them. The axis 512 is tangent to the circle described by the center-point of the universal joint 544. With the parts in the position shown in Fig. 18, the crosshead 511 is in its maximum forward position, and there is zero stroke length. The plane in which the circular path of the center-point is contained is normal to the line of movement of crosshead 511. Of course, it is at all times normal to the axis of the shaft 23. As the axis of shaft 23 is bodily tilted clockwise about the transverse axis 512, the plane in which the center-point of the driving connection rotates is tilted in a clockwise direction.

In Fig. 19, the parts have been illustrated with the shaft 23 tilted through a relatively wide angle as compared with its position in Fig. 18. In Fig. 19, it will be observed that the crosshead 511 has been moved to the right from the forward position shown in broken lines. Further to increase the stroke, as illustrated in Fig. 20, the shaft 23 has been shown as rotated about the axis 512 through an angle of 90°. The actuating member of crank 24 is then rotating to produce maximum stroke of the crosshead 511. In the modifications of Figs. 18–20, it will be observed the forward position of the crosshead is the same from zero stroke to maximum stroke and that it is unnecessary in accordance with this modification to select a full stroke position less than the maximum attainable in consideration only of constancy of the forward position of crosshead 511.

Figs. 18–20 are diagrammatic and are not to be taken as representative of the dimensioning which would be used in a commercial device. In designing a commercial device, the crank 24 may have a greater radius, the worm wheel 22 located closer to the crank 24, and other expedients, as described above, used to minimize the size of the sub-frame and the space required for its rotation about the axis 512. Stops may be provided to limit the adjustment to less than the maximum for some applications.

As further exemplary of the principles involved, reference is now to be had to the diagrammatic illustration of the modification of Fig. 21.

In Fig. 21, the ballhead 54 moves between the solid line forward position, and the broken-line rearward position. The stroke length has been materially increased over that of Figs. 1–6, and for zero stroke the shaft 23 on which the crank 24 is mounted is now inclined downwardly relative to the axis 52 of the crosshead 11. In said position, the angle GLM is equal to the angle HLK. The axis of rotation for the adjustment of the inclination of the shaft 23 occurs about the point L, and the line from that point to the center of the ballhead 54 in the forward position is a perpendicular bisector to the chord GM. The axis of the shaft 23 is a perpendicular bisector of the chord GH and intersects the center of ballhead 54 when it is in its forward position. In the modification of Fig. 21, the angle $\theta_1$ is somewhat less than in the modification of Figs. 1–6, and the angle $\theta_2$ is somewhat larger than in the modification of Figs. 1 to 6.

Depending upon the particular embodiment of the invention desired, the inclination of the shaft 23 can be in various selected positions for zero stroke and it can be bodily tilted to different positions for selection of any stroke up to full stroke. The shaft 23 can be inclined above the axis of the plunger by utilizing the previously described constructional feature.

For some applications, there may be departure from the preferred constructions as thus far explained. Where linearity is unimportant and where there may be departure from constancy of the forward position of the plunger, the geometry of the preferred construction need not be adhered to and many variations may be made while retaining the advantages of the simplified construction provided by the sub-frame 26, the built-in reduction gearing, and the simplicity of adjustment to change the stroke.

In the preferred constructions, however, there is attained to a close degree pure harmonic motion of the plunger together with the other features already discussed at length. In the modifications of Figs. 15 and 16 the plunger and crosshead in each case have a pure harmonic motion for all settings of stroke from zero to maximum.

What is claimed is:

1. A variable stroke driving mechanism comprising a driven member to be reciprocated, a driven gear having an axis of rotation, an actuating member radially spaced from said axis and driven by said gear for rotation in a plane normal to said axis, a connecting link forming a driving connection between said members, means including pivotally mounted supporting structure for said driven gear having a pivotal axis displaced from said axis of rotation for tilting said axis of rotation of said gear to change the inclination of the plane in which said driven gear is rotated to control the extent of reciprocation of said driven member, and a driving gear forming with said driven gear a speed reducer for said actuating member, the axis of rotation of said driving gear at all times lying in said plane in which said driven gear is rotated.

2. A variable stroke driving mechanism comprising a driven member to be reciprocated, a driven gear having an axis of rotation, an actuating member radially spaced from said axis and driven by said gear for rotation in a plane normal to said axis, a connecting link forming a driving connection between said members, means including pivotally mounted supporting structure for said driven gear having a pivotal axis displaced from said axis of rotation for tilting said axis of rotation of said gear to change the inclination of the plane in which said driven gear is rotated to control the extent of reciprocation of said driven member, and a driving gear forming with said driven gear a speed reducer for said actuating member, said driving gear having an axis of rotation which is coincident with said pivotal axis and which lies in said plane in which said driven gear is rotated.

3. A variable stroke driving mechanism comprising a crosshead to be reciprocated by an amount varying upwardly from zero, a driving element including a driven gear having an axis of rotation, an actuating member driven by said element and extending radially of its axis of rotation, connecting means forming a driving connection between said crosshead and said actuating member, said connecting means including a universal joint connection to said actuating member, pivotally mounted supporting structure for said element for tilting its axis of rotation to change the inclination of the plane in which said actuating member is rotated to control the extent of reciprocation of said crosshead, and a driving gear rotatable about the pivotal axis of said structure and meshing with said driven gear to form a speed reducer for said driving element.

4. A variable stroke driving mechanism comprising a driven member to be reciprocated, a drive shaft, means including bearings for supporting said shaft, a driving gear supported on said shaft and driven thereby, a driven gear meshing with said driving gear, a crank arm extending from the axis of and rotatable by said driven gear, means interconnecting said driven member and said crank arm, and supporting structure for said driven gear and said crank arm bodily rotatable about a pivotal axis for changing the inclination of the plane of the path of movement of said crank arm to vary the extent of reciprocation of said member.

5. A variable stroke driving mechanism comprising a driven member to be reciprocated, a drive shaft, means including bearings for supporting said shaft, a driving gear supported on said shaft and driven thereby, a driven gear meshing with said driving gear, a crank arm extending from the axis of and rotatable by said driven gear, means interconnecting said driven member and said crank arm, and supporting structure for said driven gear and said crank arm bodily rotatable about a pivotal axis for changing the inclination of the plane of the path of movement of said crank arm to vary the extent of reciprocation of said member, said pivotal axis being located relative to said plane for movement of said driven member to substantially the same forward position and for inclination of said plane between two positions which produce the same forward positioning of said driven member.

6. A variable stroke driving mechanism comprising a driven member to be reciprocated, a drive shaft, means for supporting said shaft, a driving gear supported on said shaft and driven thereby, a driven gear meshing with said driving gear, a crank arm having a driving center rotatable by said driven gear, means interconnecting said driven member and said crank arm, and supporting structure for said driven gear and said crank arm bodily rotatable about the axis of said drive shaft through an angle materially less than ninety degrees to change the inclination of the plane of the path of movement of said crank arm to vary the extent of reciprocation of said member from zero to full stroke, said axis of said drive shaft lying on the perpendicular bisector of the chord joining two positions of said driving center, the first for zero reciprocation of said member and the second for said full-stroke reciprocation of said member.

7. A variable stroke driving mechanism comprising a driven member to be reciprocated, a drive shaft, means for supporting said shaft, a driving gear supported on said shaft and driven thereby, a driven gear meshing with said driving gear, a crank arm having a driving center rotatable by said driven gear, means interconnecting said driven member and said crank arm, and supporting structure for said driven gear and said crank arm bodily rotatable about the axis of said drive shaft through an angle materially less than ninety degrees to change the inclination of the plane of the path of movement of said crank arm to vary the extent of reciprocation of said member from zero to full stroke, said axis of said drive shaft lying on the perpendicular bisector of the chord joining two positions of said driving center, the first for zero reciprocation of said member and the second for said full-stroke reciprocation of said member, said gears rotating in planes at right angles to each other, said driven gear being bodily movable about the axis of said driving gear during change in the inclination of said plane.

8. A variable stroke driving mechanism comprising a driven member to be reciprocated, a drive shaft, a frame, a driving gear supported on said shaft and driven thereby, a driven shaft, a driven gear secured to said driven shaft and meshing with said driving gear, a crank arm secured to said driven shaft and rotatable by said driven gear, a sub-frame supporting said driven gear and said crank arm, pivotal bearings for said sub-frame for establishing a pivotal axis of rotation about the axis of said drive shaft, means interconnecting said driven member and said crank arm, and adjusting means for rotating said sub-frame about its pivotal axis bodily to change the inclination of the plane of rotation of said driven gear and the path of movement of said crank arm to vary the extent of reciprocation of said member.

9. A variable stroke driving mechanism comprising a driven member to be reciprocated, a drive shaft, a frame, bearings for said shaft, at least one removable member including one of said bearings removably secured to said frame, a driving gear supported on said shaft and driven thereby, a driven shaft, a driven gear secured to said driven shaft and meshing with said driving gear, a crank arm secured to said driven shaft and rotatable by said driven gear, a sub-frame supporting said driven gear and said crank arm, pivotal bearings for said sub-frame for establishing a pivotal axis of rotation about the axis of said drive shaft, means interconnecting said driven member and said crank arm, and adjusting means for rotating said sub-frame about its pivotal axis bodily to change the inclination of the plane of rotation of said driven gear and the path of movement of said crank arm to vary the extent of reciprocation of said member.

10. A variable stroke driving mechanism comprising a driven member to be reciprocated, a drive shaft, an enclosing housing forming a stationary frame within which said drive shaft is journaled, a driving gear supported on said shaft and driven thereby within said housing, a sub-frame disposed within said housing, a driven shaft, said sub-frame having bearings for said driven shaft on opposite sides of said driven shaft, a driven gear carried by said driven shaft intermediate said bearings, a crank arm rotatable by said driven gear, means interconnecting said driven member and said crank arm, and bearing supports for said sub-frame establishing a pivotal axis about which said driven shaft may be bodily rotated for varying the path of movement of said crank and the extent of reciprocation of said member, said housing forming a container for operation of the mechanism in a lubricant-bath.

11. A variable stroke driving mechanism comprising a member to be reciprocated, a drive shaft, means including a frame for supporting said shaft, a driving gear supported on said shaft and driven thereby, a driven shaft, a driven gear carried by said driven shaft and meshing with said driving gear, a crank arm secured to said driven shaft and rotatable by said driven gear, a link interconnecting said member and said crank arm, and supporting structure for said driven shaft, said driven gear, and said crank arm bodily rotatable about the axis of said drive shaft from a position in which said crank arm rotates in a plane normal to the path of movement of said member to selected angular positions in which said crank arm rotates in a plane disposed at an angle to said path of movement of said member, the center of said driven gear when bodily rotated about said driving gear moving along an arc having a radius equal to the distance between the axes of said gears.

12. A variable stroke driving mechanism comprising a member to be reciprocated, a drive shaft, means including a frame for supporting said shaft, a driving gear supported on said shaft and driven thereby, a driven shaft, a driven gear carried by said driven shaft and meshing with said driving gear, a crank arm rotatable by said driven gear, a link including a universal joint connection interconnecting said member and said crank arm, and supporting structure for said driven shaft, said driven gear and said crank arm bodily rotatable about the axis of said drive shaft from a first position in which the locus of the path of rotation of said crank arm is equidistant from the forward position of said member to selected positions in which the locus of said path of rotation is tilted from its first position to produce reciprocation of said member from a substantially fixed position.

13. A variable stroke driving mechanism comprising a member to be reciprocated, a drive shaft, means including a housing for supporting said shaft, a worm supported on said shaft and driven thereby, a driven shaft, a worm wheel carried by said driven shaft and meshing with said worm, a crank arm rotatable by said worm wheel, a link including a universal joint connection interconnecting said member and said crank arm, supporting structure for said driven shaft, said worm wheel and said crank arm bodily rotatable about the axis of said drive shaft from a first position in which the locus of the path of rotation of said crank arm is equidistant from the forward position of said member to selected positions in which the plane containing said locus of rotation is tilted from its first position to produce reciprocation of said member, said worm and worm wheel forming a speed reducer, and sealing means for said housing for operation of the mechanism in a bath of lubricant.

14. A variable stroke driving mechanism comprising a member to be reciprocated, a drive shaft, means including a housing for supporting said shaft, a worm supported on said shaft and driven thereby, a driven shaft, a worm wheel carried by said driven shaft and meshing with said worm, a crank arm rotatable by said worm wheel, a link including a universal joint connection interconnecting said member and said crank arm, supporting structure for said driven shaft, said worm wheel and said crank arm bodily rotatable about the axis of said drive shaft from a first position in which the locus of the path of rotation of said crank arm is equidistant from the forward position of said member to selected positions in which the plane containing said locus of rotation is tilted from its first position to produce reciprocation of said member, said worm and worm wheel forming a speed reducer, sealing means for said housing for operation of the mechanism in a bath of lubricant, and a driving motor carried by said housing with the motor directly driving said worm.

15. A variable stroke driving mechanism, comprising a crosshead to be reciprocated between a given forward position to a selected rearward position by an amount varying from zero to a predetermined maximum, a drive shaft, means including a frame for supporting said shaft, a driving gear supported on said shaft and driven thereby, a driven gear meshing with said driving gear with their axes of rotation extending in directions normal to each other, supporting structure for said driven gear rotatable about the axis of said shaft through an angle materially less than ninety degrees for selection of the driving position of said driven gear circumferentially of said driving gear to change relative to the path of movement of said crosshead the angular position of the plane within which said driven gear rotates, a driving member driven by said driven gear and rotatable in a plane parallel to that of said driven gear, and connecting means between said driving member and said crosshead for reciprocating said crosshead between said forward position and a rearward position which coincides with said forward position when said driving member is rotated in a plane normal to said path of movement of said crosshead and which is reciprocated rearwardly from and to a substantially fixed forward position with change in the angular position of said plane of rotation of said driving member.

16. A variable stroke driving mechanism, comprising a crosshead to be reciprocated between a given forward position to a selected rearward position by an amount varying from zero to a predetermined maximum, a drive shaft, means including a frame for supporting said shaft, a driving gear supported on said shaft and driven thereby, a driven gear meshing with said driving gear with their axes of rotation extending in directions normal to each other, supporting structure for said driven gear rotatable about the axis of said shaft for selection of the driving position of said driven gear circumferentially of said driving gear to change relative to the path of movement of said crosshead the angular position of the plane within which said driven gear rotates, a driving member driven by said driven gear and rotatable in a plane parallel to that of said driven gear, connecting means between said driving member and said crosshead for reciprocating said crosshead between said forward position and a rearward position which coincides with said forward position when said driving member is rotated in a plane normal to said path of movement of said crosshead and which is reciprocated rearwardly from and to a substantially fixed forward position with change in the angular position of said plane of rotation of said driving member, said supporting structure having an extending portion, and adjusting means connected to said extending portion for rotating said structure about said shaft and for holding it in a selected position to predetermine the length of stroke of said crosshead from said forward position thereof.

17. A variable stroke driving mechanism, comprising a crosshead to be reciprocated between a given forward position to a selected rearward position by an amount varying from zero to a predetermined maximum, a drive shaft, means including a frame for supporting said shaft, a driving gear supported on said shaft and driven thereby, a driven gear meshing with said driving gear with their planes of rotation normal to each other, supporting structure for said driven gear rotatable about the axis of said shaft for selection of the driving position of said driven gear circumferentially of said driving gear to change relative to the path of movement of said crosshead the angular position of the plane within which said driven gear rotates, a driving member driven by said driven gear and rotatable in a plane parallel to that of said driven gear, and a link including a ball joint at each end connected respectively to said driving member and said crosshead for reciprocating said crosshead between said forward position and a rearward position which coincides with said forward position when said driving member is rotated in a plane normal to said path of movement of said crosshead and which is reciprocated rearwardly from and to the same forward position with change in the angular position of said plane of rotation of said driving member.

18. A variable stroke driving mechanism comprising a crosshead having a forward position and an adjustable rearward position, a link pivotally connected at one end to said crosshead, a crank having a driving connection for the other end of said link, means for rotating said crank about an axis which at zero stroke and when said crosshead is in its forward position intersects the axis of said crosshead, and structure rotatably carrying said crank and pivoted about a pivotal axis extending normal to and as a whole displaced laterally from and in spaced relation with the axis of rotation of said crank for angularly changing through an angle materially less than ninety degrees the axis of rotation of said crank to adjust the stroke of said crosshead, said pivotal axis when said crosshead is in its forward position lying on a line normal to and bisecting the chord of the arc through which the crank end of said link is moved when said axis of said crank is moved from the position of zero stroke to the position for maximum stroke.

19. A variable stroke mechanism comprising a reciprocable member, means constraining said member for movement along a linear path, an actuating arm, one end of which arm has a driving connection with said member, a motion-determining assembly including an element having a driving connection with said actuating arm, a supporting member for said element, and pivotal mounting means for said supporting member for movement of said element from a position in which said actuating arm rotates in a circular path at all points equidistant from the forward position of said reciprocable member for zero movement of said reciprocable member upon rotation of said actuating arm, said pivotal mounting means having its pivotal axis extending normal to and displaced laterally from and as a whole in spaced relation with the axis of rotation of said actuating arm, rotation of said supporting member and of said element about said pivotal axis to an angular position producing reciprocation of said reciprocable member along said linear path, the forward movement of said reciprocable member terminating at substantially the same forward position for all angular positions and for all stroke lengths as determined by said angular position of said element and its said supporting structure.

20. The combination set forth in claim 19 in which driving means are provided for rotating said reciprocable member, said driving means including a slip-connection for reciprocable movement thereof while maintaining a driving connection with said driving means.

21. The variable stroke mechanism of claim 19 in which the pivotal axis of said pivotal mounting means is tangent to said circular path.

22. The variable stroke mechanism of claim 21 in which there is provided a drive shaft, a worm driven by said drive shaft and including a worm wheel for rotating said arm.

23. The variable stroke mechanism of claim 19 in which there is provided a worm wheel, a shaft for said worm wheel forming said element, a drive shaft having a worm meshing with said worm wheel, said supporting member having bearing supports for said shaft of said worm and said worm wheel and bodily movable with said supporting member as it is moved from one angular position to another.

24. A variable stroke driving mechanism comprising a driven member to be reciprocated, a drive shaft, a driving gear supported on said shaft and driven thereby, a driven gear meshing with said driving gear, a crank arm rotatable by said driven gear, means interconnecting said driven member and said crank arm, supporting structure for said driven gear and said crank arm bodily rotatable about the axis of said drive shaft to change the inclination of the plane of the path of movement of said crank arm to vary the extent of reciprocation of said member, stationary structure in which said drive shaft is journaled, and cooperating surfaces respectively carried by said structures and slidable relative to each other for stabilizing said supporting structure during reciprocation of said driven member.

25. The variable stroke driving mechanism of claim 24 in which a driving motor is supported by said stationary structure and in which the motor shaft and said driving shaft are interconnected by a coupling member.

References Cited in the file of this patent
UNITED STATES PATENTS

| | | |
|---|---|---|
| 339,997 | Morrow | Apr. 13, 1886 |
| 1,694,834 | Sinclair | Dec. 11, 1928 |
| 2,082,446 | Dunham | June 1, 1937 |
| 2,333,104 | Hopkins | Nov. 2, 1943 |
| 2,638,847 | McGowan | May 19, 1953 |
| 2,699,725 | Quinn | Jan. 18, 1955 |
| 2,699,726 | Quinn | Jan. 18, 1955 |

FOREIGN PATENTS

| | | |
|---|---|---|
| 21,937 | France | Nov. 22, 1920 |
| 116,462 | Germany | Sept. 12, 1899 |

UNITED STATES PATENT OFFICE

CERTIFICATE OF CORRECTION

Patent No. 2,892,352                        June 30, 1959

Royal Bartlett Saalfrank

It is hereby certified that error appears in the printed specification of the above numbered patent requiring correction and that the said Letters Patent should read as corrected below.

Column 3, line 61, after the numeral "37" insert -- and --; column 5, line 74, after "through" strike out "to"; column 8, line 63, after "make" insert -- it --; column 14, line 64, for "driven", first occurrence, read -- drive --.

Signed and sealed this 26th day of July 1960.

(SEAL)
Attest:

KARL H. AXLINE
Attesting Officer

ROBERT C. WATSON
Commissioner of Patents